United States Patent Office 3,660,559
Patented May 2, 1972

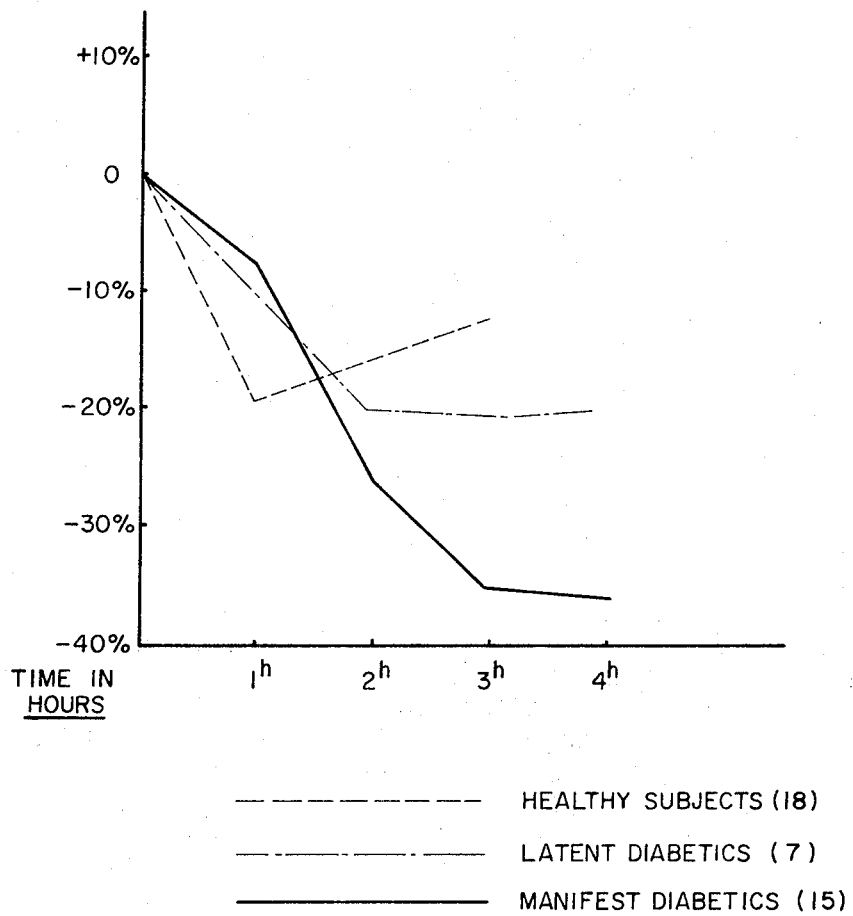

3,660,559
DIAGNOSTIC METHOD
Herbert Alfred Buckert, Basel, and Eckehard Lorch, Reinach, Switzerland, assignors to Hoffmann-La Roche Inc., Nutley, N.J.
Filed June 22, 1970, Ser. No. 48,227
Int. Cl. G01n 31/00, 33/16
U.S. Cl. 424—9
5 Claims

ABSTRACT OF THE DISCLOSURE

A method for the detection of diabetes utilizing cis-1 - (2 - hydroxycyclohexyl) - 3 - (p-tolylsulfonyl)-urea is described.

BRIEF DESCRIPTION OF THE INVENTION

The invention relates to a method for the detection of diabetes which comprises the steps of measuring the blood glucose level of a fasting patient, administering orally an effective amount of cis-1-(2-hydroxycyclohexyl)-3-(p-tolylsulfonyl)-urea to said patient, again measuring the blood glucose level at two or more spaced time intervals following the administration of the cis-1-(2-hydroxycyclohexyl) - 3 - (p-tolylsulfonyl)-urea and recording the results.

DETAILED DESCRIPTION OF THE INVENTION

For many years the standard oral glucose tolerance test (OGTT) has been utilized to test for diabetes. However, this test can give rise to nausea and vomiting and also has the disadvantage of a low degree of reproducibility. Therefore, new ways of diagnosing diabetes accurately have been sought.

It has been known to administer tolbutamide by the intravenous route to a fasting subject in order to diagnose the presence or absence of diabetes. However, the foregoing test procedure must be performed by a doctor or other qualified medical attendant; firstly, because an injection is required, and secondly, because the test may result in profound hypoglycemia. A further disadvantage of this procedure is that 1,000 mg. of tolbutamide in 20 cc. of solution must be used (see "Diabetes Mellitis: Diagnosis and Treatment," vol. 1, pp. 41–45, published by the American Diabetes Assn., Inc., 1964).

It has been proposed to use tolbutamide orally for diagnosing diabetes (see Boshell et al., Metabolism 12:108–16, February 1963), however, a much larger dose (2,000 mg.) of the sodium salt of tolbutamide together with a larger dose (4,000 mg.) of sodium bicarbonate is required.

In accordance with the present invention, it has now been found that cis-1-(2-hydroxycyclohexyl)-3-(p-tolylsulfonyl)-urea, which is an effective hypoglycemic agent of short-lasting activity (see South African Pat. No. 67/4471, Derwent No. 30,823, Book 712 and co-pending application Ser. No. 48,482, filed June 22, 1970, which in turn is a continuation-in-part application of Ser. No. 656,036, filed July 26, 1967, commonly owned with the captioned application now abandoned), can be used in the accurate diagnosis of diabetes. The cis-1-(2-hydroxycyclohexyl)-3-(p-tolylsulfonyl)-urea is administered for this diagnostic purpose in a low oral dose (500 mg.) and the test is usually completed in two hours. The dose of 500 mg. is the optimum dose for the purposes of this invention. Larger doses, for example, up to 1,000 mg. may be used, but they do not make easier the distinction between healthy human subjects and diabetics and are more expensive. In some instances, doses of less than 500 mg. may also be successful, for example, a dose of as low as 250 mg. may be used, but the distinction between healthy subjects and manifest diabetics will be more difficult. The presence of a doctor or other medical attendant is not required, since the oral route is used and the only blood sample required is capillary blood (finger tip or ear lobe blood). Venous blood, however, may also be used.

In the drawing:

FIG. 1 graphically sets forth the results obtained when the diagnostic procedure of the invention was applied to 40 human subjects.

The test according to the present invention is carried out as hereinafter described.

Human subjects who are suspected of being diabetics in spite of a negative glucose urine test are instructed to fast overnight and are tested before breakfast. A sample of blood is taken immediately before the administration of a single oral dose of 500 mg. of cis-1-(2-hydroxycyclohexyl)-3-(p-tolylsulfonyl)urea. Thereafter, blood samples are taken from the fasting subject one hour and two hours after the administration of cis-1-(2-hydroxycyclohexyl)-3-(p-tolylsulfonyl)-urea. The three blood samples are then analyzed for glucose content.

In healthy subjects the blood glucose level will normally be about 15–20% lower at one hour than at the initial fasting blood glucose level. The level at two hours will be higher than the one hour level showing that the cis-1-(2-hydroxycyclohexyl) 3-(p-tolylsulfonyl)-urea is extremely short acting, not metabolized, and rapidly and completely eliminated, and that therefore there is no danger of prolonged hypoglycemia and no great need to give a glucose dose to the subject after carrying out the test procedure.

Where the human subject is a diabetic, firstly, the blood glucose level at one hour after administration of the dose of cis -1- (2-hydroxycyclohexyl)-3-(p-tolylsulfonyl)-urea will usually be about from 5–10% less than the blood glucose level at zero time (the fasting blood sugar level or FBS). It will be noted that this in itself provides some distinction between healthy subjects and diabetic subjects. However, of much greater significance is the fact that the blood sugar level at two hours after administration is lower than the level at one hour. The blood sugar level at two hours after administration of cis-1-(2-hydroxycyclohexyl)-3-(p-tolylsulfonyl)-urea is generally from 20–30% less than the blood sugar level at the time of administration. If within two hours the blood glucose level does not fall by at least 10%, then it is likely that the patient is a diabetic of a type which is not susceptible to treatment with a sulfonyl-urea compound.

The blood glucose content of the human subject may be measured by any conventional method, for example, by the method described by D. Watson in Analytical Biochemistry 3, 131–144 (1962). Other methods which may be used include the Somogyi-Nelson test and the Autoanalyzer-ferricyanide method.

The results obtained when the diagnostic procedure of this invention was performed on 40 subjects is hereinafter summarized. Of the 40 subjects, 18 were known to be healthy, 7 were known to be latent diabetics and 15 were known to be manifest diabetics. 500 mg. of cis-1-(2-hydroxycyclohexyl)-3-(p - tolylsulfonyl)-urea was administered orally to each fasting subject and at the same time a blood sample was taken to determine the fasting blood glucose level. Samples of blood were taken from each subject one hour and two hours after administration of cis-1-(2-hydroxycyclohexyl)-3-(p-tolylsulfonyl)-urea. The glucose level of all the blood samples was measured by the method of D. Watson above mentioned. The results are summarized in Table I and tabulated in FIG. 1. The summarized results of FIG. 1 and Table I for the three different types of subjects, i.e., healthy subjects, latent diabetics and manifest diabetics, show clearly the distinction between healthy subjects and diabetics of either type. The key recognition factor for healthy subjects is the rapid achievement of the lowest blood glucose level, followed by a rise in the blood glucose level within the second hour following administration.

The possibility of distinguishing between latent and manifest diabetics is, as a practical matter, somewhat more difficult using the test of this invention unless the blood glucose content is also measured at three hours after administration of cis-1-(2-hydroxycyclohexyl)-3-(p - tolylsulfonyl)-urea. However, again as a practical matter, this distinction may automatically resolve itself since prior to the test of this invention being carried out a normal glucose urine test, either post-prandial or otherwise, may have been effected. A manifest diabetic shows a high blood glucose level at all times, but of course, especially post-prandially or after administration of a glucose load. A latent diabetic shows a low blood glucose level after fasting and will show no glycosuria even post-prandially or after a glucose load.

The graph of FIG. 1 sets forth the summarized results of tests on 18 healthy subjects, 7 latent diabetics and 15 manifest diabetics. It can be seen from the solid line curve for manifest diabetics that their blood glucose level continues to descend after two hours to below 30% of the fasting blood sugar level, whereas the level for latent diabetics is much the same at three hours as for two hours. This represents a method of distinguishing between manifest and latent diabetics, if required. Although, as mentioned above, the distinction between manifest and latent diabetics will be done by combining the result of the test of the present invention with an ordinary glucose test. The analysis of the significance of the measurements, i.e., the blood glucose levels, may be effected in accordance with the guides hereinbefore set forth.

In any event, the test of the present invention will be of value, when extended to three hours in diagnosing cases where a patient has diabetic glomerolosclerosis and in whom the renal threshold for glucose is abnormally high.

TABLE I

The Figures Used to Prepare the Graph (Also Showing the Standard Errors)

|  | 1 hour | 2 hours | 3 hour |
|---|---|---|---|
| Healthy subjects (18 subjects) | −19.2±3.0% | −16.1±2.0% | −12.7±2.3% |
| Latent diabetics (7 subjects) | −8.6±2.6% | −19.9±5.1% | −21.0±6.7% |
| Manifest diabetics | −9.3±3.0% | −24.1±3.3% | −35.2±3.3% |

The preparation of cis-1-(2-hydroxycyclohexy)-3-(p-tolylsulfonyl)-urea is exemplified as follows:

A suspension of 9.65 g. of the sodium salt of p-toluenesulfonamide in 50 ml. of dimethylformamide is treated at −10° with 8.5 g. of carbonyldimidazole. The reaction mixture is stirred at −10° for 20 minutes and then treated with 7.5 g. of cis-2-aminocyclohexanol hydrochloride. Thereafter, the reaction mixture is allowed to warm to room temperature, stirred for an additional 2 hours and evaporated in vacuum. The residue is taken up in 60 ml. of 1 N caustic soda solution. The resulting solution is washed with ether and the ethereal wash solution is extracted with 40 ml. of 1 N caustic soda solution. The aqueous solutions are combined and are made congo-acid with 3 N hydrochloric acid solution. This solution is extracted with ethylacetate to yield cis-1-(2-hydroxycyclohexyl)-3-(p-tolylsulfonyl)-urea, having a melting point of 156–160° (from ethanol/water).

The following table exemplifies the acute toxicity of cis-1-(2-hydroxycyclohexyl)-3-(p-tolylsulfonyl)-urea:

TABLE II

Acute Toxicity in Mice

| Route of administration | Compound | $LD_{50}$ (mg./kg.) |
|---|---|---|
| Intraperitoneal (i.p.) | cis-1-(2-hydroxycyclohexyl)-3-(p-tolylsulfonyl)-urea. | 1800 |
| Per os (p.o.) | | >5000 |

Tablets to be utilized in the diagnostic method of the invention are prepared utilizing conventional techniques and may have the following formula:

| | Mg. |
|---|---|
| 1-(p - toluenesulfonyl)-3-(cis-2-hydroxycyclohexyl)-urea | 500 |
| Corn starch | 88 |
| Gelatin | 6 |
| Talc | 5 |
| Magnesium stearate | 1 |
| Total weight | 600 |

We claim:
1. A method for the detection of diabetes by recognition factors which distinguish between latent and manifest diabetics and healthy subjects which comprises:
   (a) measuring the fasting blood glucose level of a sample of blood taken from a fasting patient suspected of being a diabetic;
   (b) immediately after such measurement, orally administering to said patient a diagnostically effective low oral dosage amount of cis-1-(2-hydroxycyclohexyl)-3-(p-tolylsulfonyl)-urea an effective hypoglycemic agent of short-lasting activity;
   (c) thereafter measuring the fasting blood glucose level of at least two more blood samples taken from said patient at two or more hourly spaced time intervals following the administration of the cis-1-(2-hydroxycyclohexyl)-3-(p-tolylsulfonyl)-urea; and
   (d) recording such measurements to thereby distinguish [1] latent diabetics showing a low blood glucose level much the same for three hours as for two hours after fasting; [2] manifest diabetics showing a blood glucose level which continues to descend after two hours to below 30 percent of the fasting blood sugar level; wherein in diabetic subjects [1] and [2] the blood glucose level one hour after administration of the dose will usually be about from 5 to 10 percent less than the initial fasting blood glucose level, and the blood sugar level at two hours after administration is lower than at one hour, and generally from 20 to 30 percent lower than at the time of administration; said diabetic subjects [1] and [2] being thereby distinguishable from [3] healthy subjects showing rapid achievement of a blood glucose level about 15 to 20 percent lower at one hour than at the initial fasting blood glucose level, which is followed by a rise in the blood glucose level within the second hour following administration; said method being without danger of prolonged hypoglycemia and a need to give a glucose dose to normal subjects after carrying out the test procedure.

2. A method in accordance with claim 1, wherein the amount of cis-1-(2-hydroxycyclohexyl)-3-(p - tolylsulfonyl)-urea administered is from 250 mg. to 1,000 mg.

3. A method in accordance with claim 1, wherein the amount of cis-1-(2-hydroxycyclohexyl)-3-(p - tolylsulfonyl)-urea administered is 500 mg.

4. A method in accordance with claim 2, wherein the blood glucose level in step (c) is measured one and two hours after the administration of cis-1-(2-hydroxycyclohexyl)-3-(p-tolylsulfonyl)-urea.

5. A method in accordance with claim 4, wherein the blood glucose level in step (c) is also measured three hours after the administration of cis-1-(2-hydroxycyclohexyl)-3-(p-tolylsulfonyl)-urea.

References Cited

Boshell, B. R. et al.: Metabolism 12(2):108–116, February 1963, "A New Oral Diagnostic Test for Diabetes Mellitus."

(Other references on following page)

Vecchio, T. J. et al.: Arch. Intern. Med. 115:116–6, February 1965, "Oral Sodium Tolbutamide and Glucose Tolerance Tests."

Massey, R. U.: Henry Ford Hosp. Med. Bull. 14:31–41, March 1966, "Oral Tolbutamide Response Test in the Diagnosis of Diabetes Mellitus."

Tittle, C. R., Jr. et al.: Diabetes 15:212–9, March 1966, "A Comparison of the Oral Sodium Tolbutamide Test and the Oral Glucose Tolerance Test in Selected Hospital Patients."

Meyer, H.: Ges. Inn. Med. (Ger.) 20:443–5, July 15, 1965, "On the Value of the Oral Tolbutamide Test for Therapeutic Indications."

Marigo, S.: Clin. Ter. (Ital.) 30:457–466, Aug. 31, 1964, "Diagnostic Application of Oral Hypoglycemizing Drugs in Diabetes Mellitus."

Derwent Farmdoc Complete Specifications, Book 712, #30823, issued Mar. 5, 1968, pp. 371–383.

SHEP K. ROSE, Primary Examiner

U.S. Cl. X.R.

23—230; 424—321